United States Patent [19]

Tielemans et al.

[11] 4,213,659
[45] Jul. 22, 1980

[54] CONNECTING ROD BEARING ARRANGEMENT

[75] Inventors: Leonardus P. M. Tielemans; Johannes A. G. de Deugd, both of Eindhoven, Netherlands

[73] Assignee: U.S. Philips Corporation, New York, N.Y.

[21] Appl. No.: 880,097

[22] Filed: Feb. 22, 1978

[30] Foreign Application Priority Data

Feb. 22, 1977 [NL] Netherlands ............... 7701855

[51] Int. Cl.² ............................................. F16C 3/14
[52] U.S. Cl. .................................... 308/167; 74/605; 308/23; 308/170
[58] Field of Search ............ 308/9, 76, 78, 23, 122, 308/163, 167, 168, 170, 172, 179; 184/6.5; 123/196 R; 74/605

[56] References Cited

U.S. PATENT DOCUMENTS

| | | | |
|---|---|---|---|
| 1,384,227 | 7/1921 | Belk et al. | 308/167 |
| 1,612,372 | 12/1926 | Gussman | 184/6.5 |
| 1,745,871 | 2/1930 | Spillmann | 308/122 |
| 1,898,659 | 2/1933 | Gardner | 308/122 |
| 2,628,136 | 2/1953 | Pittman | 308/167 |

FOREIGN PATENT DOCUMENTS

| | | | |
|---|---|---|---|
| 2635061 | 2/1978 | Fed. Rep. of Germany | 308/167 |
| 1165188 | 9/1969 | United Kingdom | 308/122 |

*Primary Examiner*—Charles E. Frankfort
*Attorney, Agent, or Firm*—Robert S. Smith

[57] ABSTRACT

A bearing arrangement for a connecting rod big end journalled on a crankshaft pin, for lubrication by splash or mist. Adjoining the cylindrical journal on the crankshaft pin and the rod big end, facing generally planar surfaces on the crankshaft and the rod big end have a pattern of shallow lubricant pumping grooves to provide a constant, reliable flow of oil through the bearing. At the opposite end of the connecting rod plain bearing, other plane surfaces may provide either draining grooves or grooves which pump oil outward to an axial bearing surface.

1 Claim, 4 Drawing Figures

CONNECTING ROD BEARING ARRANGEMENT

BACKGROUND OF THE INVENTION

The invention relates to splash or mist lubricated sleeve bearings, and more particularly to such a bearing that is especially adapted for use on a connecting rod big end which is journalled on a throw or pin of a crankshaft.

Lubrication of connecting rod big end bearings has long been known through the aid of splash or oil mist, but with this method there is no way of guaranteeing that a controlled or satisfactorily adjustable amount of lubricant will be supplied. Further, because there is not a well defined flow of lubricant through the bearing, cooling of the bearing surfaces is primarily obtained by conduction of heat through the connecting rod and the crankshaft rather than by supplying relatively cool lubricant to, and removing heated lubricant from, the bearing.

To guarantee a supply and flow of oil to and through the bearing, it is also well known to use pressure lubrication, but this requires an oil pump which is an additional part, as well as a mechanical drive for the oil pump. Further, because a crankshaft throw is continually moving with respect to the frame of the rest of the machine, the entire machine and crankshaft are made larger and more complex because of the need for associated ducts and passageways through the crankshaft. This tends to make the construction of pressure lubricated machines relatively expensive.

The use of spiral grooves to provide lubrication of a plain bearing has also been proposed. British patent specification 21,833 shows helical grooves in a cylindrical surface for carrying oil upward from a sump and supplying it to a plain cylindrical shaft bearing. British Pat. No. 239,138 similarly shows a helical groove which conducts oil from a cavity to a thrust bearing. However, each of these bearing arrangements requires a substantial screw element to move the lubricant, thus substantially lengthening the bearing arrangement.

In another proposed arrangement according to U.S. Pat. No. 3,494,674, both axial and radial loads can be supported by a bearing having a helical groove for pressurizing lubricant in a shaft end journal, and a spiral groove in the end surface of the shaft for pumping lubricant toward the center of the thrust bearing to develop a high thrust force. However, no significant flow through the bearing will occur, so that removal of heat by the lubricant is not possible.

SUMMARY OF THE INVENTION

The object of the invention is to provide a splash or mist lubricated bearing which ensures an adequate supply of lubricant to the bearing surfaces without the need for a separate mechanical pump.

A further object of the invention is to provide for cooling of the bearing by a positive flow of lubricant from an inlet region through the bearing and out an outlet region.

To satisfy these objects, in a bearing arrangement according to the invention the crankshaft has a generally planar lubricant supplying surface fixed to the crank at one side of each connecting rod big end, and the big end has a generally planar surface facing that on the crankshaft, at least one of these facing surfaces having a pattern of shallow lubricant pumping grooves. With this arrangement, lubricant, which is always present on the outer surfaces of the crank and the connecting rod because of the splashing or mist, is pumped through the crank journal by the grooves due to the relative movement between the connecting rod big end and the facing surface fixed to the crank. This ensures that there will be a sufficient supply of lubricant, and that a steady flow will be obtained through the bearing whenever the crank is rotating, so that bearing cooling is also obtained.

In a preferred embodiment, to concentrate lubricant at the outer junction of the big end and the lubricant supply member, as close as possible to the vicinity of the pumping groove inlet, at least one of the facing surfaces has a beveled outer circumference to form a tapered groove in which lubricant is retained by surface tension until it is pumped through the shallow spiral grooves.

In a further preferred embodiment, to ensure that lubricant which is supplied at the one side of the bearing can readily flow away at the outer side, at the side of the connecting rod which is remote from the member, a plurality of oil draining grooves are also provided. These are advantageously located in an annular area concentrically disposed about the crank pin, and surrounded by an ungrooved area such that pressure is built up in the oil in the ungrooved area to provide axial bearing support.

Thus, a bearing arrangement according to the invention provides the performance advantages of a pressure lubrication system but without the complexity. Further, operation in extremely tipped or inverted attitudes is possible while maintaining good lubrication, because there is no problem with oil failing to return to a sump for recirculation by a central oil pump.

The invention will be described hereinafter in greater detail with respect to the embodiments shown in the drawing.

DESCRIPTION OF THE PREFERRED EMBODIMENTS

Figure 1A:
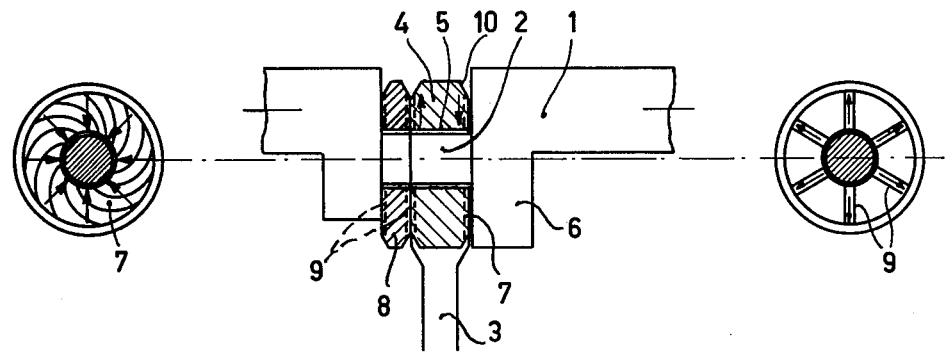
FIGS. 1a, 1b and 1c are schematic views not to scale, partly in section taken longitudinally through a crank pin, of a crank throw according to the invention having a single connecting rod and different patterns of oil pumping and draining grooves in the connecting rod or supply member.
Figure 1B:
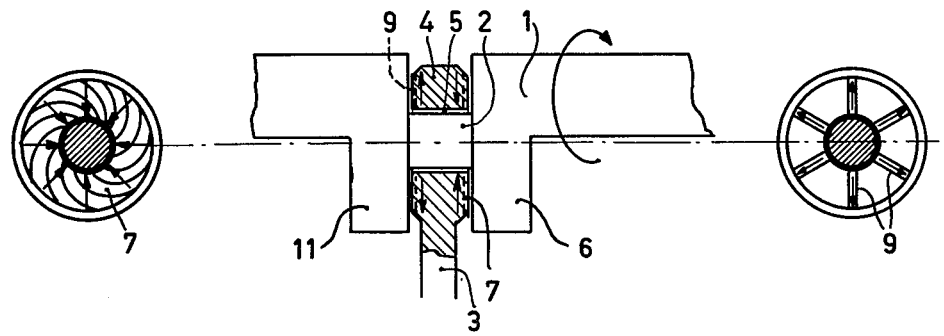
Figure 1C:
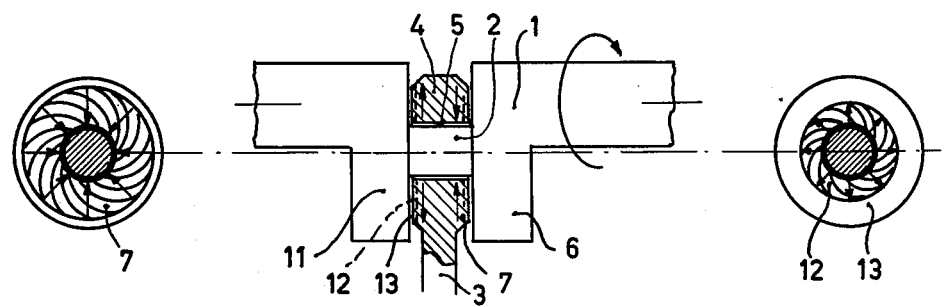

In FIGS. 1a, 1b and 1c the same reference numerals are used for similar parts having similar functions. In each a crankshaft 1 has a throw formed by a crank pin 2 about which a connecting rod 3 is journalled at a big end 4 of the rod, a plain cylindrical bearing 5 of any well-known type being seated in the big end.

The throw of the crankshaft 1 is formed by a web 6 to one side of the rod big end, which is a pumping end of the cylindrical journal on the pin 2 about which the bearing 5 is fitted. The web 6 has a planar surface perpendicular to and adjoining the pumping end of the pin 2 facing a corresponding generally planar surface on the big end 4 adjoining the pumping end of the plain bearing 5, the surface on the big end 4 having a pattern 7 of shallow lubricating oil pumping grooves arranged so as to pump oil inwardly toward the crank pin during normal operation.

In the embodiment of FIG. 1a, to the side of the big end 4 opposite the face having the pattern 7, a ring 8 is freely journalled on the crank pin between the connecting rod and a second planar surface on the other web of the throw of the crankshaft. The ring 8 has a plurality of grooves 9 formed on both generally planar side-facing surfaces of the ring, through which lubricating oil which has flowed between the journal surface of the pin 2 and the bearing 5 can drain to the circumference of the ring 8.

To provide a more dependable supply of oil to the pumping grooves 7, the circumference of the facing surface (in which the grooves 7 are formed) is provided with a bevel 10, so as to provide a tapered groove between the big end and the crank web in which oil is concentrated and retained by surface tension.

During operation oil is pumped from the tapered groove through the groove pattern 7 and between the plane bearing 5 and the journal surface of the pin 2 so that the bearing space is always filled with lubricant; by suitable choice of the groove patterns a sufficient flow of oil may be obtained to provide cooling of the bearing. This oil which is fed to the bearing then flows away through the grooves 9 in the ring 8.

The embodiment of FIG. 1b is similar to that of 1a except that the loosely fitted ring 8 is dispensed with, and instead the crank has a web 11 having a generally planar surface facing a corresponding generally planar surface joining the end of the bearing 5 opposite the pumping end, the planar surface in the rod having a groove pattern 9 which has radial grooves that do not provide pumping action, but merely permit oil to be drained from the journal area.

The embodiment of FIG. 1c has a different draining arrangement in which instead of grooves 9, grooves 12 are arranged in an annular area concentric about the journal 5 in the generally planar surface of the crank big end, the annular grooved area being surrounded by an ungrooved annular area 13. The grooves 12 are preferably arranged so as to provide an outward pumping effect, so that pressure is built up between the generally planar side surface of the rod big end and the web of the crank, with the result that an axial bearing surface is also formed between the rod big end and the web 11.

Figure 2:
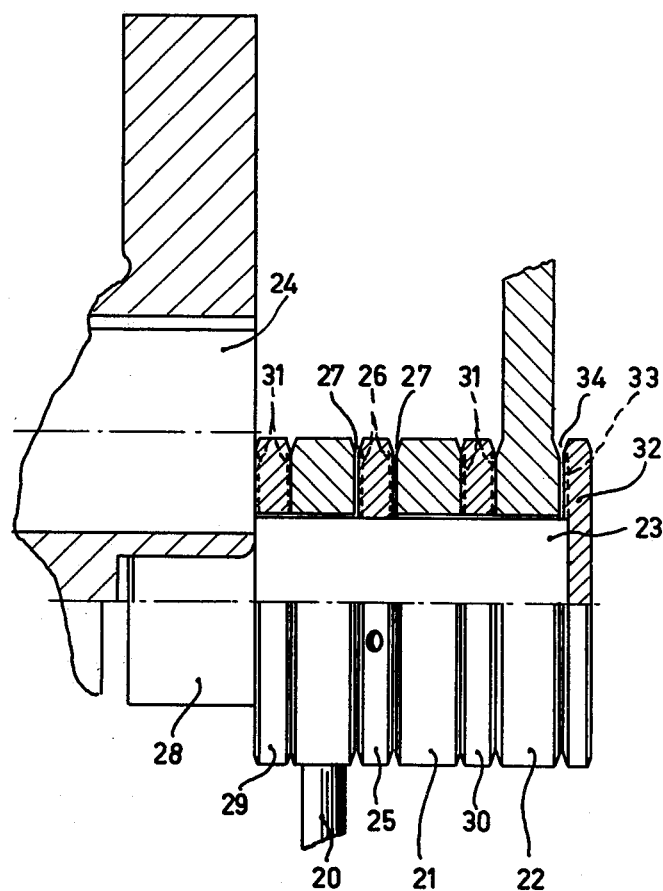
FIG. 2 is a schematic longitudinal section, not to scale, of a crank having a plurality of connecting rods journalled on the same pin.

The embodiment of FIG. 2 demonstrates an arrangement in which a plurality of connecting rods can be journalled about a single overhung crank pin. In this embodiment a crankshaft 24 has a pin 23 projecting eccentrically from the shaft, the big ends 20, 21 and 22 of three connecting rods being journalled on the pin. Connecting rod big ends 20 and 21 are separated by a ring 25 rigidly fastened on the crank pin, the ring having a pattern of shallow lubricant pumping grooves 26 formed on each of its generally planar sides. At the inlet of the groove pattern 26, both the outer circumference of the ring 25 and the generally planar facing surfaces of the big ends 20 and 21 are beveled so as to define tapered lubricant retaining grooves 27 on each side of the ring 25. Drainage of the lubricating oil pump between the bearing of the rod big end and the pin journal is provided by rings 29 and 30, the ring 29 being loosely fitted on the pin 23 between a crank web 28 and the big end 21; while the ring 30 is loosely fitted between the big ends 21 and 22. Each of these rings has grooves 31 on both sides, through which oil can drain away from the crank pin. On the outside of the big end 22 a retaining ring 32 is rigidly fastened to the crank, the retaining ring having a generally planar surface matching a facing surface on the rod big end 22. Like the arrangement of the ring 25, the retaining ring 32 on its surface facing the big end 22 has a pattern 33 of oil pumping grooves, and bevels on the circumference of the retaining ring and the big end 22 form a tapered groove 34 for retention of oil at the inlet of the pattern 33.

The arrangement of FIG. 2 provides the same advantageous operation of the embodiments of FIG. 1, because a reliable flow of oil is assured between each of the rod big ends and the pin, and also between each rod big end and the generally planar surfaces bounding its sides.

It will be clear to those of ordinary skill in the art that many variations on the above described embodiments are possible. For example, it is usually easier to form the shallow pumping grooves in small parts such as the rings 25 and 32, rather than forming pumping grooves on a side surface of a connecting rod big end or a crankshaft web. However, a connecting rod such as that shown in FIG. 1 can be used with rings having planar surfaces in FIG. 2, so that the connecting rods would be interchangeable. Thrust bearing arrangements like FIG. 1c can be advantageous in a multi-connecting rod journal such as in the basic layout of FIG. 2. Similarly, in FIG. 1 a ring could be provided, rigidly fastened to the pin 2, having a pattern of pumping grooves on its generally planar surface facing the rod big end 4. Further, the ring whether used for pumping or draining can be formed as a split ring for ease in assembly on a crankshaft throw, particularly if a plurality of connecting rods are to be journalled on the same throw.

It will also be clear that bevel surfaces can be formed in the crank web so as to define tapering grooves for the supply of oil, and that oil scoops or capillary material layers can be used to provide a greater supply of oil to the bevel or other inlet of the pumping groove pattern.

Further, while lubricating oil has been described for the preferred embodiment, the invention is operable with any lubricant which will wet or otherwise provide proper lubricating action on the materials of the crank and the connecting rod. For example, where some of the bearing materials are non-metallic, water may be an advantageous lubricant.

We claim:

1. A bearing arrangement for a connecting rod journalled on a crankshaft pin comprising:
   a crankshaft having a crank pin and an elongated cylindrical journal disposed on said pin, a generally planar crankshaft surface substantially perpendicular to and adjoining an axial extremity of said journal,
   a plurality of connecting rods each having a big end and an elongated plain cylindrical bearing seated in said big end which cooperates with said cylindrical journal with said plain cylindrical bearings disposed in coaxial relationship; each of said big ends having a generally planar connecting rod surface substantially perpendicular to said cylindrical bearing at each axial extremity thereof, said crankshaft further including a plurality of lubricant supply members rigidly fastened to said crank pin each lubricant supply member of said plurality of lubricant supply members being located intermediate two of said connecting rods, each supply member having first and second axial extremities, each axial extremity of said member including a generally planar surface having shallow lubricant pumping grooves cooperating with one of said generally planar surfaces of said connecting rods which are disposed on each side of each of said lubricant supply members; both sides of said lubricant supply member being beveled around the outer circumference thereof to form a tapered circumferential groove for retaining lubricant.

* * * * *